United States Patent
Li et al.

(10) Patent No.: US 9,537,404 B2
(45) Date of Patent: Jan. 3, 2017

(54) AC-DC POWER SUPPLY INPUT VOLTAGE DETECTION AND MONITORING

(71) Applicant: Dialog Semiconductor Inc., Campbell, CA (US)

(72) Inventors: Yong Li, San Jose, CA (US); Hien Huu Bui, San Jose, CA (US); David Nguyen, Santa Clara, CA (US); Fuqiang Shi, Oak Park, IL (US)

(73) Assignee: Dialog Semiconductor Inc., Campbell, CA (US)

( * ) Notice: Subject to any disclaimer, the term of this patent is extended or adjusted under 35 U.S.C. 154(b) by 186 days.

(21) Appl. No.: 14/034,070

(22) Filed: Sep. 23, 2013

(65) Prior Publication Data

US 2014/0085941 A1 Mar. 27, 2014

Related U.S. Application Data

(60) Provisional application No. 61/704,853, filed on Sep. 24, 2012.

(51) Int. Cl.
*H02M 3/335* (2006.01)
*H02M 1/00* (2006.01)

(52) U.S. Cl.
CPC ..... *H02M 3/33507* (2013.01); *H02M 3/33523* (2013.01); *H02M 2001/0022* (2013.01); *H02M 2001/0032* (2013.01); *Y02B 70/16* (2013.01)

(58) Field of Classification Search
CPC .............. H02M 3/33507; H02M 3/33523; H02M 1/4258; H02M 1/32; H02M 1/36; H02M 3/33553; H02M 5/2573

USPC ......... 363/21.04–21.1, 21.12–21.18
See application file for complete search history.

(56) References Cited

U.S. PATENT DOCUMENTS

| | | | | |
|---|---|---|---|---|
| 5,734,564 A | * | 3/1998 | Brkovic | H02M 3/33523 363/20 |
| 6,385,059 B1 | * | 5/2002 | Telefus | H02M 3/33507 363/21.07 |
| 8,222,882 B2 | * | 7/2012 | Balakrishnan | H02M 3/33507 323/283 |
| 2008/0031021 A1 | * | 2/2008 | Ros | H02M 1/4258 363/46 |

(Continued)

OTHER PUBLICATIONS

STIC Search Report.*

*Primary Examiner* — Gary L Laxton
*Assistant Examiner* — Henry Lee, III
(74) *Attorney, Agent, or Firm* — Fenwick & West LLP

(57) ABSTRACT

A power converter includes a transformer with a primary and a secondary winding and a switch. A controller of the power converter at the primary winding side of the transformer generates a control signal to turn on or turn off the switch, the switch being turned on responsive to the control signal being in a first state and the switch being turned off responsive to the control signal being in a second state. The controller determines current through the primary winding generated while the switch is turned on and indirectly detects an input voltage to the power converter based on the current through the primary winding generated while the switch is turned on. The controller in turn may detect conditions such as a loss of power or brown out at the input of the power converter based on the indirectly detected input voltage.

16 Claims, 13 Drawing Sheets

(56) References Cited

U.S. PATENT DOCUMENTS

| | | | | |
|---|---|---|---|---|
| 2009/0015228 A1* | 1/2009 | Sato | ................. | H02M 3/33523 |
| | | | | 323/283 |
| 2010/0039836 A1* | 2/2010 | Gong | .................... | H02M 3/156 |
| | | | | 363/21.13 |
| 2011/0193494 A1* | 8/2011 | Gaknoki | ............. | H02M 1/4258 |
| | | | | 315/297 |
| 2011/0194312 A1* | 8/2011 | Gaknoki | ............... | H02M 1/083 |
| | | | | 363/21.12 |

* cited by examiner

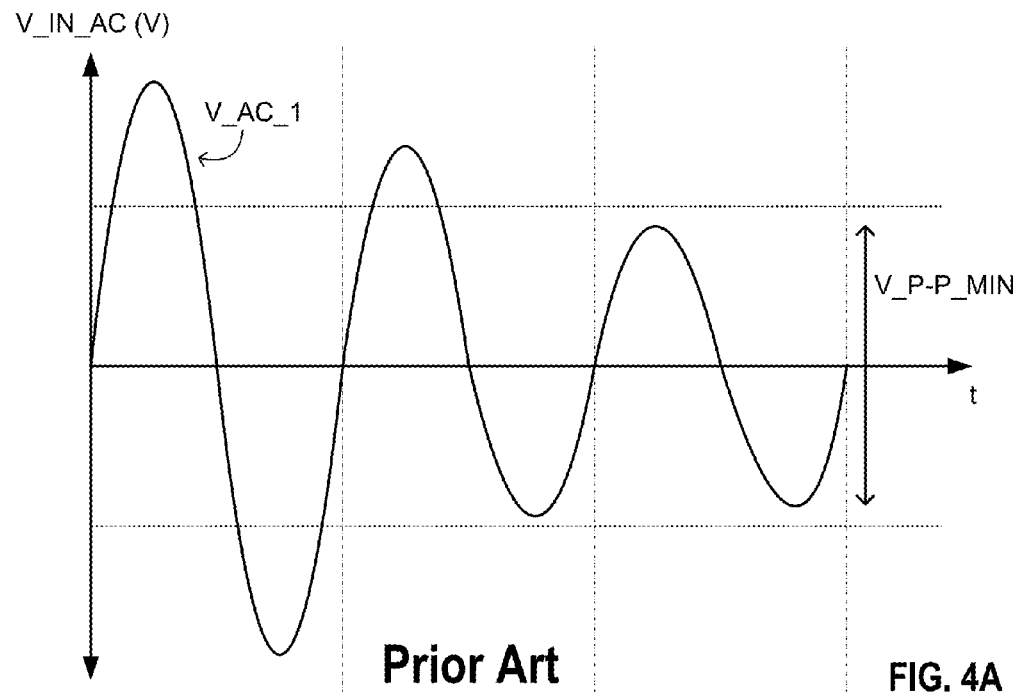
Prior Art  FIG. 4A
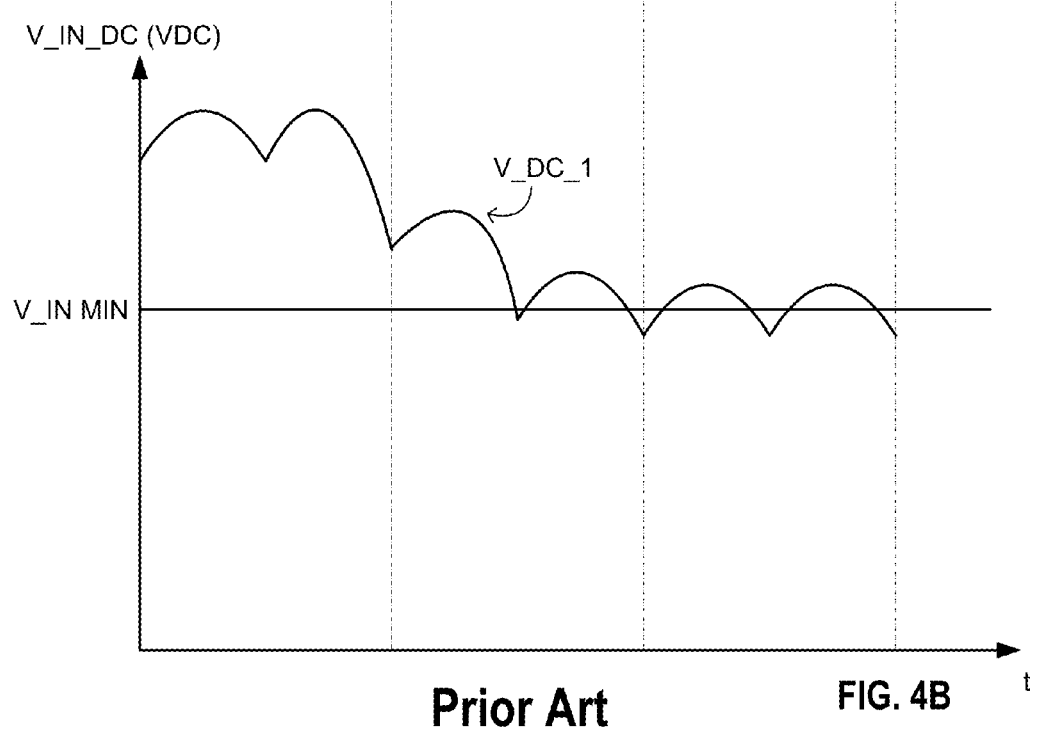
Prior Art  FIG. 4B

AC-DC POWER SUPPLY INPUT VOLTAGE
DETECTION AND MONITORING

CROSS-REFERENCE TO RELATED
APPLICATIONS

This application claims the benefit under 35 U.S.C. §119 (e) from U.S. Provisional Patent Application No. 61/704,853 filed on Sep. 24, 2012 and entitled "AC-DC Power Supply Input Voltage Detection and Monitoring," which is incorporated by reference herein in its entirety.

BACKGROUND

This invention relates generally to a power supply and more particularly to the detection and monitoring of the magnitude and shape of the input voltage waveform for a switching power converter.

Switching power converters are designed to receive unregulated alternating current (AC) input power and provide regulated outputs to loads such as electronic devices. Typically, a low frequency AC power source (e.g., 90-270 Volts AC (VAC) at 50-65 Hertz (Hz)) is rectified to provide an unregulated direct current (DC) power source, which is input to a power stage of a switching power converter. In turn, the power stage provides a regulated DC power source to the load.

FIG. 1 illustrates a conventional switching power converter 100 topology for delivering electrical power from an AC power source 104 to a load 107. The AC input source 104 is coupled to a rectifier 101 which converts the AC input into an unregulated DC output 102. The power conversion stage 105 is coupled to receive the unregulated DC output 102 from the rectifier 101 and, in turn, provide a regulated DC output 106 to the load 107. The rectifier 101 may be a bridge rectifier that provides full-wave rectification of the AC input source 104. Additionally, the unregulated DC output 102 may be filtered with a bulk capacitor 103 coupled to the output of the rectifier 101.

A conventional flyback power conversion stage 105 typically includes a transformer that provides galvanic isolation between the primary side and the secondary side, and a primary-side switch for electrically coupling or decoupling the load to the unregulated DC output 102, and a switch controller coupled to the switch for controlling the on-time and off-time of the switch. Energy from the unregulated DC output 102 may be stored in the gap of the transformer when a switch is on and is transferred to the load when the switch is off. The switch controller controls the switch to be turned on or off with on-times or off-times that are adjusted at the operating frequency of the power converter according to the adopted regulation scheme, such as pulse width modulation and/or pulse frequency modulation, in order to regulate the output voltage 106 provided to the load 107. In many cases, switching power converters 100 are required to operate over a "universal input range", allowing for the worldwide operation of the electronic devices. Variation in the AC input source 104 can lead to changes in the output 106 for a given on-time and off-time of the switch. Accordingly, the on-time and off-time of the switch may be modified by the controller based upon a feedback signal (e.g., reflecting the output voltage) to provide a regulated output 106 to the load 107.

FIG. 2A illustrates waveforms for an example universal AC input 104 operating range (V_IN_AC) that may fluctuate between 90 VAC to 270 VAC. As described above, the bridge rectifier 101 converts the V_IN_AC into an unregulated DC output 102 and the bulk capacitor 103 filters the unregulated DC output. FIG. 2B illustrates waveforms for an unregulated DC operating range (V_IN_DC) corresponding to the V_IN_AC range of FIG. 2A. The resulting DC input voltage of power conversion stage 105 effectively extends from a minimum value (V_IN_MIN), at the zero crossing of the AC input voltage while set at 90 VAC, to a maximum value (V_IN_MAX), at the peak of the AC input waveform while set at 270 VAC.

In order to insure proper operation, it is desirable for a switching power converter 100 to monitor the unregulated DC input 102 of the power stage 105. In conjunction with monitoring the unregulated DC input 102, additional protection and safety features may be included should the DC input voltage deviate from the specified operating range (e.g., exceed V_IN_MAX or drop below V_IN_MIN) and/or when the switching power converter 100 has become uncoupled from the AC input voltage source.

FIG. 3 illustrates an example block diagram of a flyback power supply 300 where the waveforms of the unregulated DC voltage 302 are consistent with those shown in FIG. 2B. As shown, a bridge rectifier 303 is coupled to the AC input (not shown) and input bulk capacitor 304 is coupled across the output of the bridge rectifier 303 to filter the unregulated DC voltage 302. The unregulated DC voltage 302 is input to the power stage 305, which includes power transformer 309, controller 301, and switch SW. Controller 301 is coupled to the switch SW and regulates the DC output 306 by controlling the on-time and off-time (e.g., the duty cycle) of the switch SW at an operating frequency of the switching power converter 300. Controller 301 may also sense DC voltage 302 at voltage sense pin V_IN. One commonly used technique is to sense the magnitude of the DC voltage 302 (or a scaled waveform thereof from a voltage divider) using an analog-to-digital converter (ADC). Monitoring of the magnitude of the DC voltage 302 at the V_IN pin of the controller 301 may enable detection of a brown-out condition and a loss of AC source condition (e.g., due to a decoupling of the AC source from the rectifier 303).

Brown-out conditions represent potentially damaging conditions for power supplies 300, especially when operating in areas where AC sources are unreliable. In brown-out conditions, the AC input voltage drops to a level that is below the specified operating range (e.g., 90-270 VAC) of the power converter 300. For example, in areas where the AC input voltage range is 90 VAC to 130 VAC, brown-out conditions exist when the AC input voltage drops below 90 VAC. As a result, the DC voltage 302 input to the power conversion stage may drop below the specified operating range of the power conversion stage 305. Continued operation in brown-out conditions can lead to a number of undesirable results, including increased thermal conditions of power converter 300 components, power converter component failure and damage, and damage to the load 107 due to loss of regulation of the output 306. Often times, a brown-out condition is brief, lasting only a few AC cycles. However, when brown-out conditions persist over longer periods of time, the power supply may suffer permanent damage.

FIGS. 4A and 4B illustrate example waveforms for AC input voltage (V_AC_1) and the corresponding unregulated DC input voltage (V_DC_1) of a power stage during a brown-out condition. FIG. 4A shows the AC input voltage (V_AC_1) fall below the minimum specified Peak-Peak level (V_P-P_MIN) corresponding to a brown out condition. FIG. 4B illustrates the resulting DC voltage level (V_DC_1) dropping below the minimum DC input voltage level (V_IN_MIN) (i.e., as specified by a controller).

Loss of an AC source condition may occur when the switching power converter has been uncoupled or unplugged from the AC input voltage source. For example, many switching power converters are used to recharge the batteries of electronic devices such as cellular telephones and tablet computers. The switching power converter often remains connected to the AC input voltage source once the portable device has been detached from the power supply. In response, the power converter may enter into a "sleep-mode" in which internal power consumption is significantly reduced while the power converter maintains a regulated voltage output in anticipation of a device being reconnected. Often times, the power converter may be unplugged from the AC input voltage source while it is in a "sleep-mode". As a result of the reduced power consumption, the unregulated DC input voltage may remain within the operating range of the power stage due to a large bulk capacitance 304 for an extended period of time.

FIGS. 5A and 5B illustrate example waveforms for AC input voltage (V_AC_2) and the corresponding unregulated DC input voltage (V_DC_2) of a power stage during a loss of an AC source condition at time t_1. Similar to the brown out condition, the persistence of unregulated DC input voltage (V_DC_2) below the V_IN_MIN threshold can cause damage to the power supply. Additionally, if the load has been decoupled from the regulated output, maintaining the regulated output after time t_1 by the controller may present a safety hazard for the end user or manufacturing personnel during the test and assembly of the power supply.

SUMMARY

Embodiments described herein include a system and method for a switching power converter that determines current through a primary winding generated while a switch is turned on to indirectly detect an input voltage to the power converter.

Embodiments include a transformer coupled between an input and an output of the switching power converter, the transformer including a primary winding coupled to the input to receive an input voltage and a secondary winding coupled to output voltage of the switching power converter; a switch coupled to the primary winding of the transformer, current through the primary winding being generated while the switch is turned on and not being generated while the switch is turned off; and a controller at a primary winding side of the transformer and configured to generate a control signal to turn on or turn off the switch, the switch being turned on responsive to the control signal being in a first state and the switch being turned off responsive to the control signal being in a second state, the controller further configured to indirectly detect the input voltage to the switching power supply based on the current through the primary winding generated while the switch is turned on.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 4A illustrates the AC input voltage falling below a minimum specified Peak-Peak level and FIG. 4B illustrates the resulting DC voltage level dropping below the minimum DC input voltage level, during a brown out condition.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments of power converters described herein indirectly detect an input voltage to the power converter based on the current through the primary winding generated while the switch is turned on. The controller in turn may detect conditions such as a loss of power or brown out at the input of the power converter based on the indirectly detected input voltage waveform. Embodiments may include a transformer with a primary and a secondary winding and a switch. A controller of the power converter at the primary winding side of the transformer generates a control signal to turn on or turn off the switch, the switch being turned on responsive to the control signal being in a first state and the switch being turned off responsive to the control signal being in a second state. The controller determines current through the primary winding generated while the switch is turned on and indirectly detects an input voltage to the power converter based on the current through the primary winding generated while the switch is turned on. The controller in turn may detect conditions such as a loss of power or brown out at the input of the power converter based on the indirectly detected input voltage.

The indirect detecting of the input voltage enables the use of a controller without the usage of costly circuitry such as dedicated V_IN sense pin and associated analog-to-digital converter (ADC) circuitry of a controller.

Figure 6A:
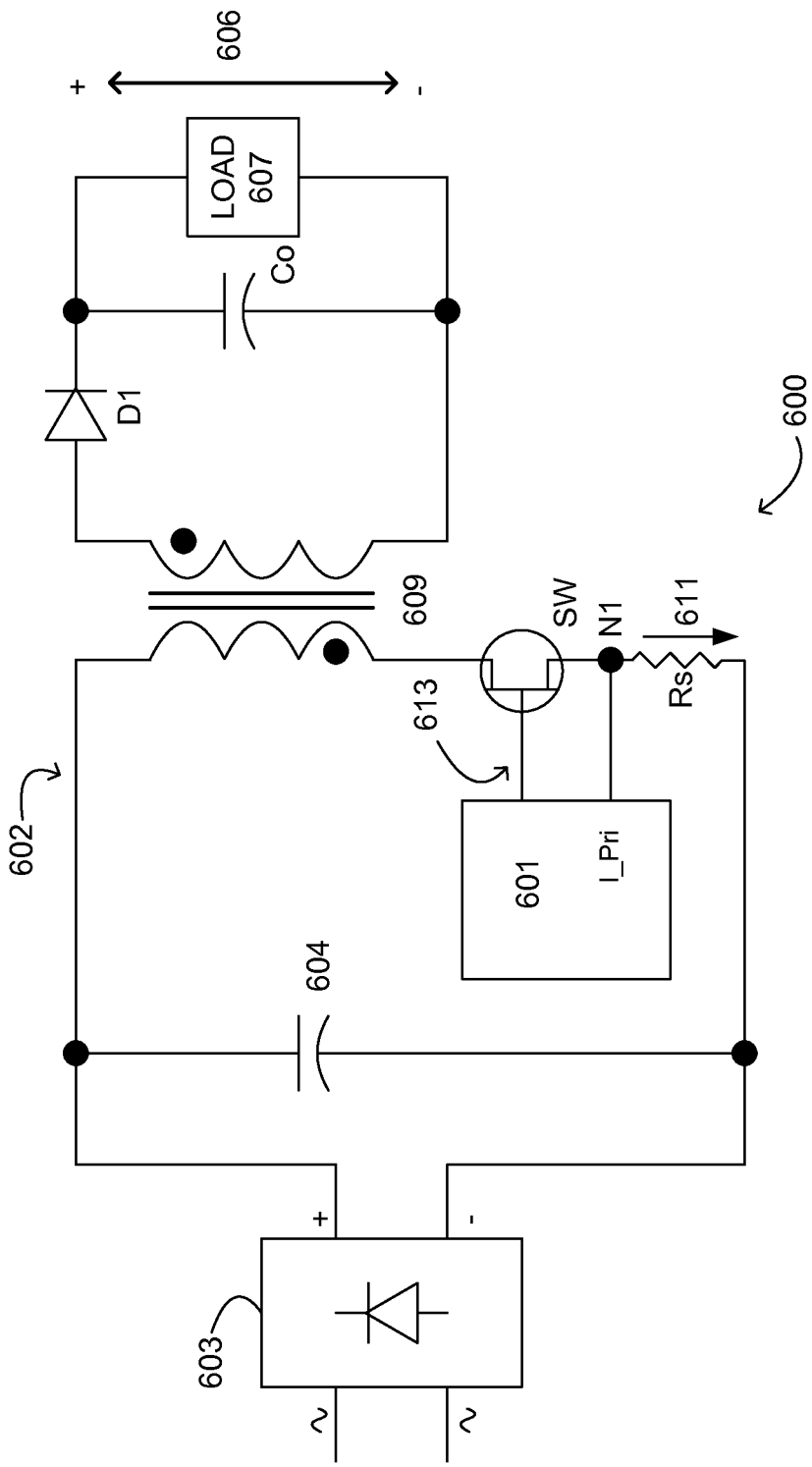
FIG. 6A illustrates an example embodiment of a flyback power converter with indirect sensing of the unregulated DC voltage.

FIG. 6A illustrates an example embodiment of a flyback power converter 600 with indirect sensing of the unregulated DC voltage 602. AC power is received at a rectifier 603 from an AC power source (not shown). The rectifier 603, in turn, provides the unregulated DC input 602 to the transformer 609. A bulk capacitor 604 is coupled across the unregulated DC input 602. A primary-side controller 601 generates a drive signal 613 which defines the "ON" and "OFF" cycles of the switch SW at the operating frequency of the switching power converter 600. Input power is stored in transformer 609 while the switch SW is turned on during the "ON" cycles because the diode D1 becomes reverse biased. The power stored in the transformer 609 is then transferred to the load 607 across the capacitor $C_O$ while the switch SW is turned off during the "OFF" cycles because the diode D1 becomes forward biased. The controller 601 may define the "ON" cycles and "OFF" cycles based on a feedback signal (not shown) indicative of the output voltage 606 to regulate power converter output voltage 606 delivered to the load 607. Diode D1 functions as an output rectifier and capacitor $C_o$ functions as an output filter for the regulated output 606. Controller 601 can employ any one of a number of well-known modulation techniques, such as pulse-width-modulation (PWM) or pulse-frequency-modulation (PFM), to control the ON and OFF states and duty cycles of power switch SW.

Figure 3:
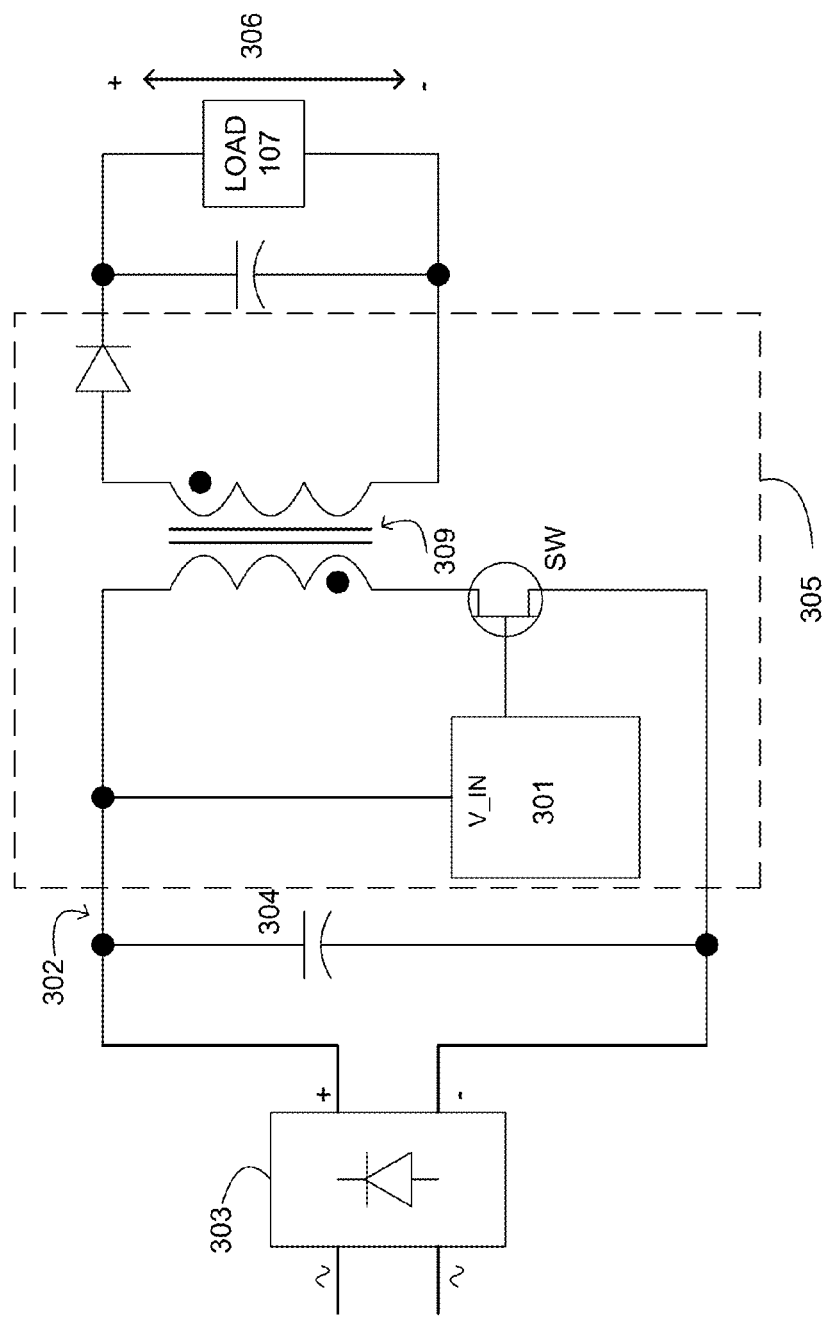
FIG. 3 illustrates an example block diagram of a flyback power supply where the unregulated DC voltage waveforms are consistent with those shown in FIG. 2B.

Controller 601 (unlike the controller of FIG. 3) does not include a dedicated V_IN pin coupled to the unregulated DC input 602. Consequently, the controller 601 does not directly sense the unregulated DC input voltage 602. Instead, controller 601 determines the magnitude of the DC input voltage 602 from primary current 611 through the primary windings of transformer 609 and the switch SW during the on-time of each "ON" and "OFF" cycle. The controller 601 utilizes these measurements to provide an indirect, real-time measurement of the DC input voltage without requiring costly sensing devices and circuits. Accordingly, the controller 601 includes a current sense pin I_Pri that receives a voltage based on the primary current 611 through a sense resistor Rs having a known value. The on-time and off-time of the switch SW can be modified by the controller 301 based on feedback signals (not shown) representing output voltage 606 and primary side current 611 (e.g., based on the magnitude of the voltage at node N1 across sense resistor Rs).

Figure 7:
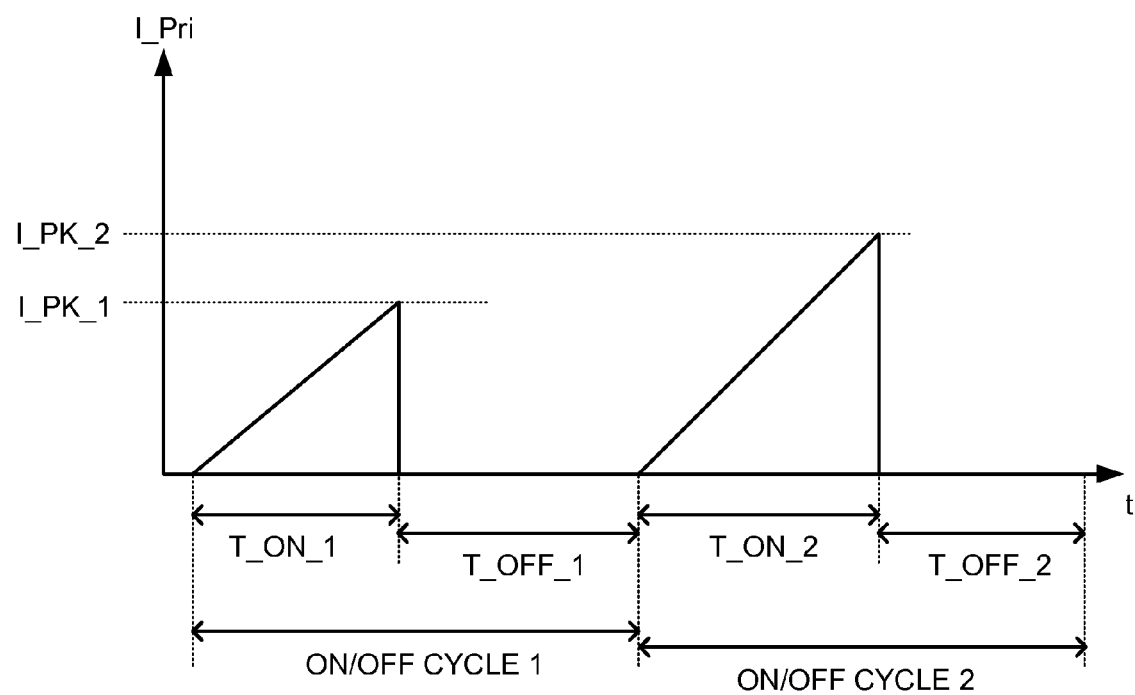
FIG. 7 illustrates example operating waveforms of current through the primary-side of a transformer of a flyback power converter.

FIG. 7 illustrates example operating waveforms of current 611 through the primary-side of a transformer 609. As shown, peak current (I_PK) through the primary-side of the transformer 609 for a given switching cycle may increase or decrease based on T_ON and T_OFF times of the switch during the different cycles. Unregulated DC input voltage (V_IN_DC) may be determined from the current 611 through the primary-side (I_Pri) of the transformer (having magnetizing inductance Lm) using the equation V_IN_DC= (I_PK)×(Lm)/(T_ON). Here, Lm is the magnetizing induction of transformer 609, T_ON is the on-time of the switch SW, and I_PK is the peak of the primary current 611.

Accordingly, the DC input voltage during each "ON" and "OFF" cycle may be determined based on measuring the primary peak current (I_PK) and resulting on-time (T_ON). This allows for an accurate and real time reconstruction of the magnitude and shape of the DC input voltage waveform. In the case of the two switching cycles (CYCLE_1 and CYCLE_2) shown in FIG. 7, the corresponding unregulated DC input voltage during each switching cycle may be determined from the corresponding I_PK and T_ON values using the equation V_IN_DC=(I_PK)×(Lm)/(T_ON).

Figure 8A:
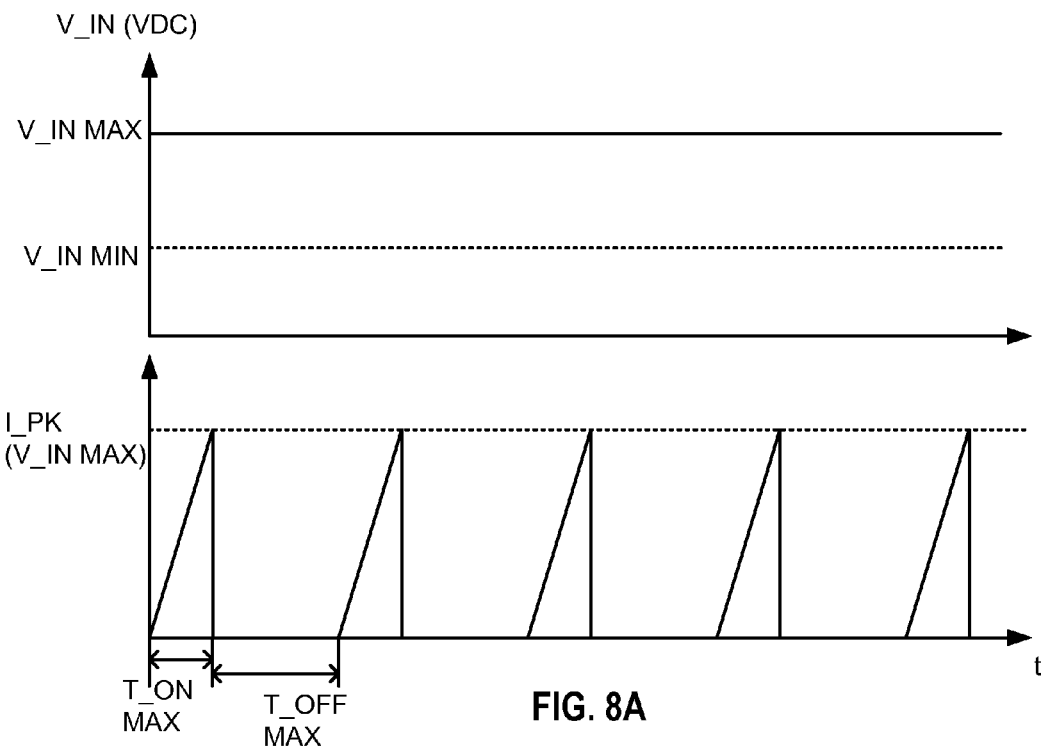
FIGS. 8A and 8B illustrate waveforms corresponding to operating conditions of the controller illustrated in FIG. 6A, according to one embodiment.
Figure 8B:
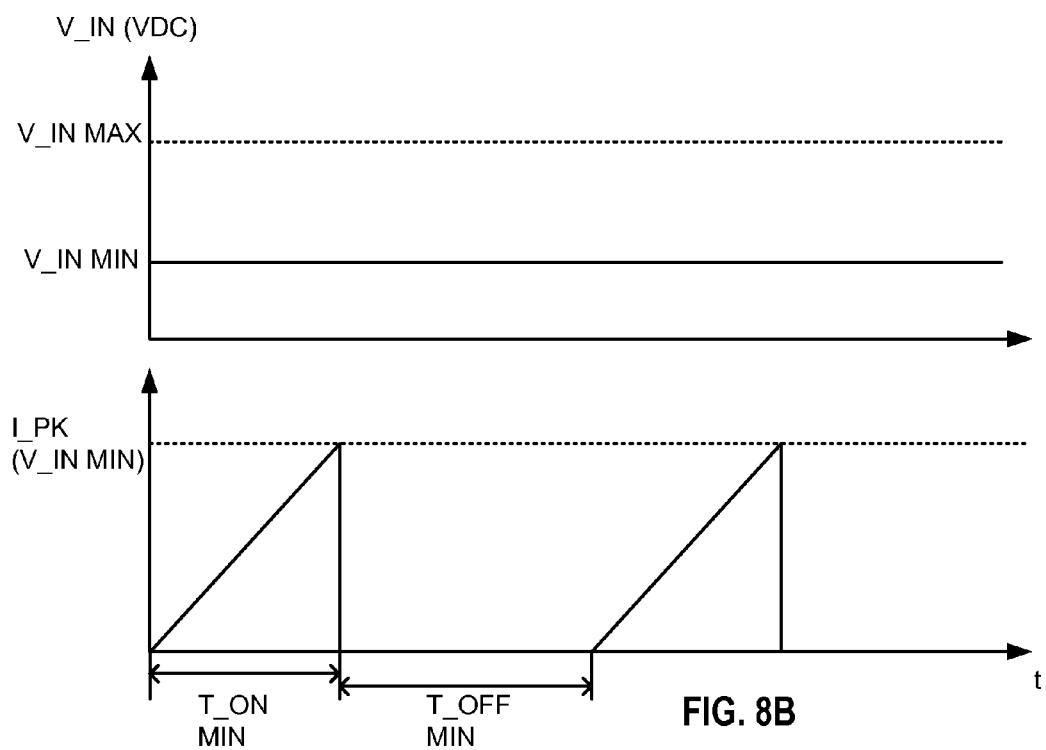

FIGS. 8A and 8B illustrate waveforms corresponding to operating conditions of the controller 601 illustrated in FIG. 6A, according to one embodiment. The controller 601 provides output regulation by defining the "ON" and "OFF" cycles based on a feedback signal and by setting primary peak current through transformer 609 at a constant threshold. Output regulation is accomplished by varying the T_ON and T_OFF times of the "ON" and "OFF" cycle of the switch SW.

FIG. 8A shows the power supply 601 operating when the DC input voltage 602 is at the maximum value. With the primary peak current (I_PK) set at a constant threshold, the resulting on-time (T_ON MAX) remains at a constant value over load conditions.

FIG. 8B shows the power supply operating when the DC input voltage is at the minimum value. With the primary peak current (I_PK) set at a constant threshold, the resulting on-time (T_ON MIN) remains at a constant value over load conditions.

Additionally, as the unregulated DC input power for V_IN MAX is greater than for V_IN MIN, the resulting on-time (T_ON MIN) while operating at V_IN MIN will be greater than the on-time (T_ON MAX) while operating at the maximum input voltage level V_IN MAX. When the primary peak current (I_PK) remains at a constant threshold, the equation determining the DC input voltage becomes: V_IN_DC=K1/(T_ON) where K1 is a constant value of (I_PK)*(Lm).

In other words, when the primary peak current (I_PK) remains at a constant threshold, the measured on-time of each "ON" and "OFF" cycle of switch SW varies substantially inversely with the DC input voltage 602 by a constant factor, K1.

In addition to the case where the primary peak current (I_PK) remains at a constant threshold, which often times is the case in pulse frequency modulation (PFM) control, I_PK thresholding can also be applied to pulse width modulation (PWM) control and other control schemes where the output regulation is achieved by defining the "ON" and "OFF" cycles based on a feedback signal, even where the primary peak current is not necessarily set at a constant threshold, e.g., the primary peak current may vary from one switching cycle to another.

Figure 6C:
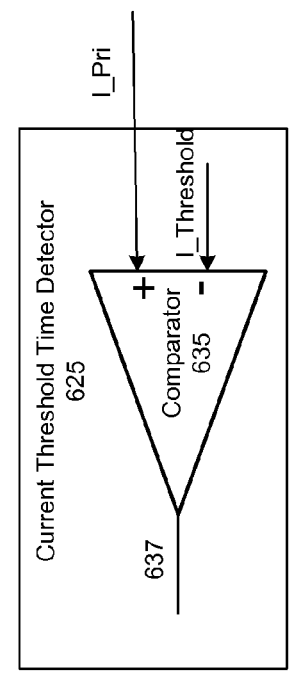
FIGS. 6B and 6C illustrate example components of the controller illustrated in FIG. 6A, according to one embodiment
Figure 6B:
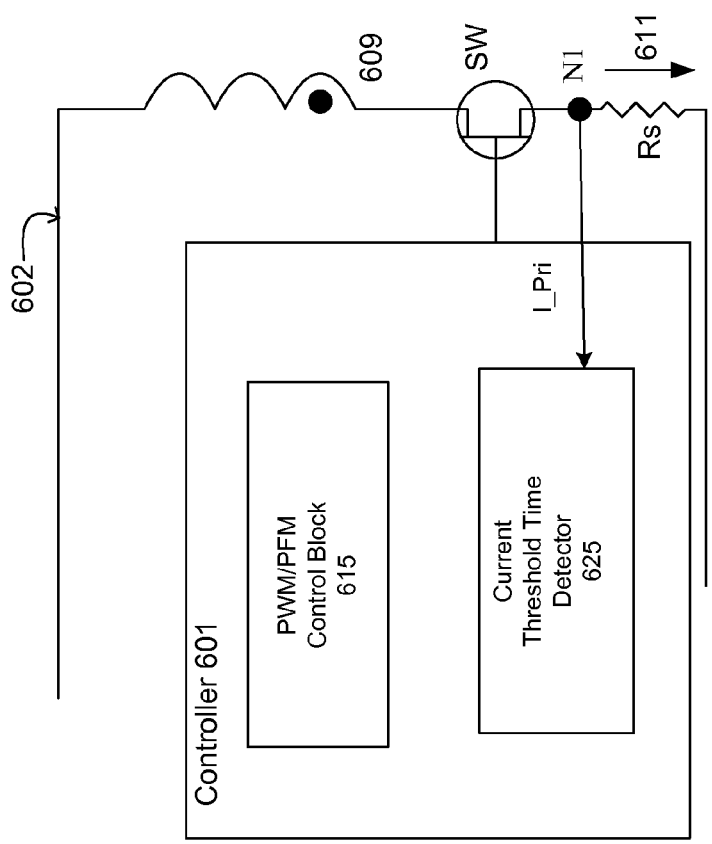

FIGS. 6B and 6C illustrate example components of the controller 601 illustrated in FIG. 6A, according to one embodiment. As shown, the controller 601 includes a PWM/

PFM control block 615 which adjust the switching frequency and primary peak current, and a Current Threshold Time Detector 625.

Figure 9:
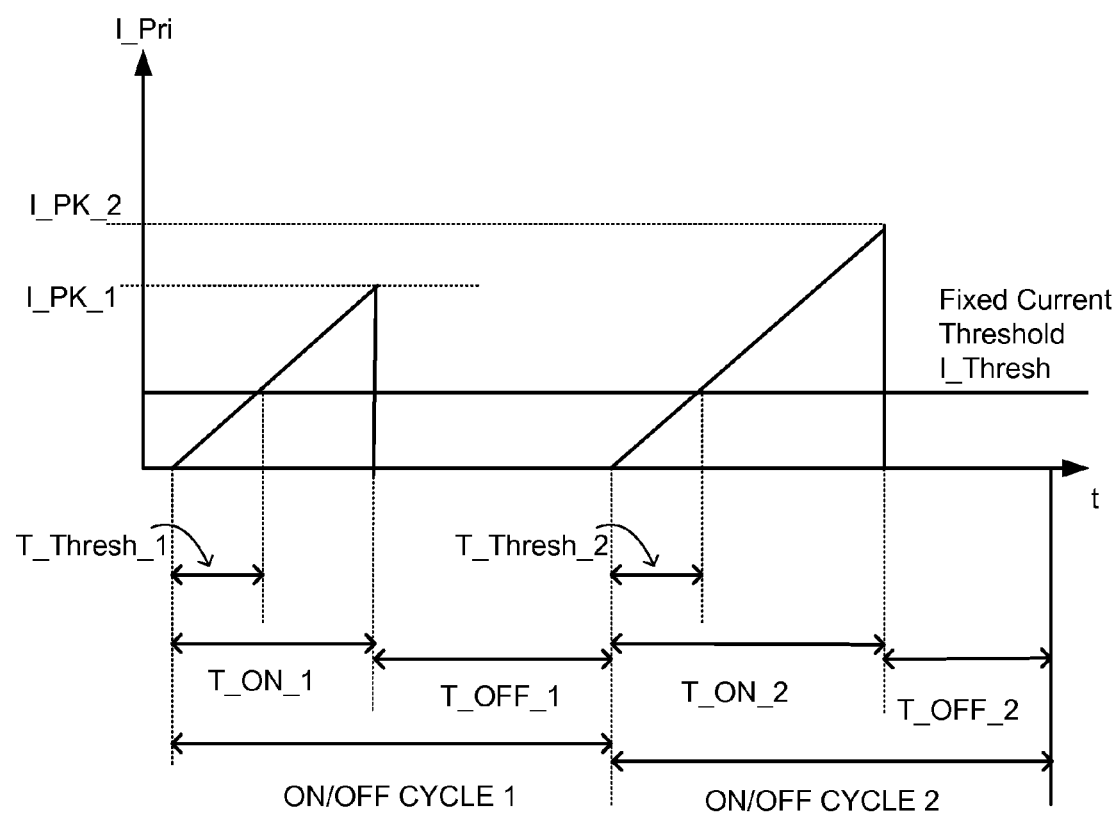
FIG. 9 illustrates a waveform where the primary peak current differs among different ON/OFF cycles.

The Current Threshold Time detector 625 detects the time to the current threshold, T_Thresh (e.g., as shown in FIG. 9), by determining the time from the moment the switch SW is turned on until the primary current 611 through the transformer 609, I_Pri, reaches the constant threshold value I_Thresh. The equation for determining T_Thresh becomes: T_Thresh=(I_Thresh)×(Lm)/(V_IN_DC). In one embodiment, such T_Thresh may be determined at every switching cycle of the switching power converter 600, and thus the DC input voltage may also be determined at every switching cycle of the switching power converter 600.

In one embodiment, the current threshold time detector 625 includes a comparator 635 for determining when a voltage at node N1 across the sense resistor, Rs, corresponding to current 611 through the primary-side of the transformer, I_Pri, reaches a predetermined threshold voltage corresponding to I_Thresh. The positive terminal of the comparator 635 is coupled to node N1 and the negative terminal of comparator 635 is coupled to a voltage source providing threshold voltage corresponding to I_Thresh.

Accordingly, when the voltage at node N1 reaches the threshold voltage I_Thresh set at the negative terminal, the comparator 635 output 637 goes high. In turn, the time, T_Thresh, for node N1 to reach the threshold voltage I_Thresh, may be determined from a value of one or more counters (not shown) that activate at T_ON and are read proximate to when the comparator 635 output 637 is driven high, or by other means. The threshold voltage I_Thresh may be set at the negative terminal of the comparator 635, which may be equal or lower than node N1 voltage corresponding to the lowest primary peak current, I_PK, for a given set of unregulated DC input voltage 602 and load conditions of the power converter 600.

For example, as shown in FIG. 9, while the primary peak current I_PK may differ among different ON/OFF cycles (e.g., CYCLE 1 and CYCLE 2), the threshold current I_Thresh may remain constant among the different ON/OFF cycles, for similar V_IN_DC values. In fact, using the fixed current threshold I_Thresh, the equation determining the time T_Thresh to reach the fixed current threshold I_Thresh can yield DC input voltage as: V_IN_DC=K2/(T_Thresh) where K2 is constant and equal to (I_Thresh)*(Lm).

In other words, the measured Current Threshold Time, T_Thresh, of each "ON" and "OFF" cycle varies inversely to the DC input voltage 602 by a constant factor independent of changes in peak current from I_PK_1 to I_PK_2.

Figure 1:
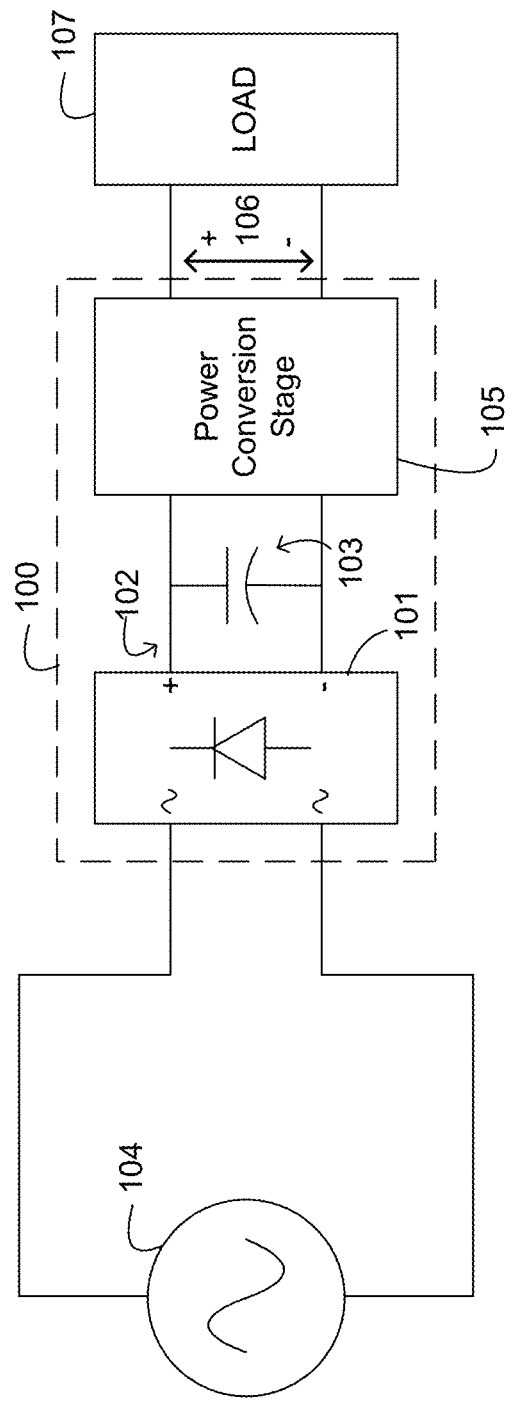
FIG. 1 illustrates a conventional switching power converter topology for delivering electrical power from an AC power source to a load.
Figure 2A:
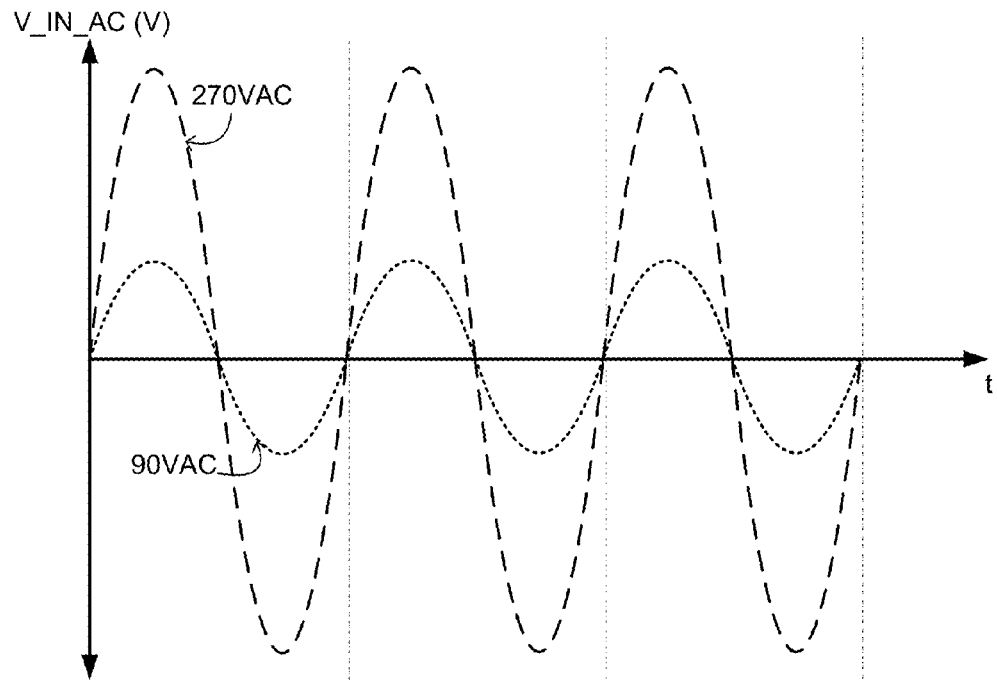
FIG. 2A illustrates waveforms for an example universal AC input operating range between 90 VAC to 270 VAC.
Figure 2B:
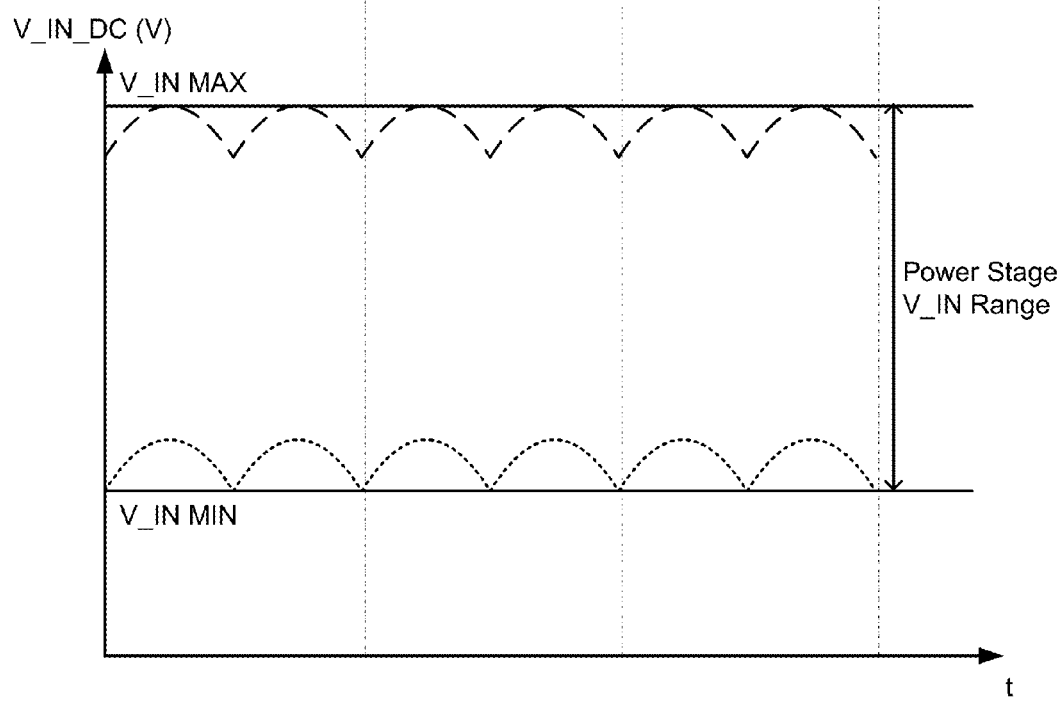
FIG. 2B illustrates waveforms for an unregulated DC operating range corresponding to the V_IN_AC range of FIG. 2A.
Figure 10:
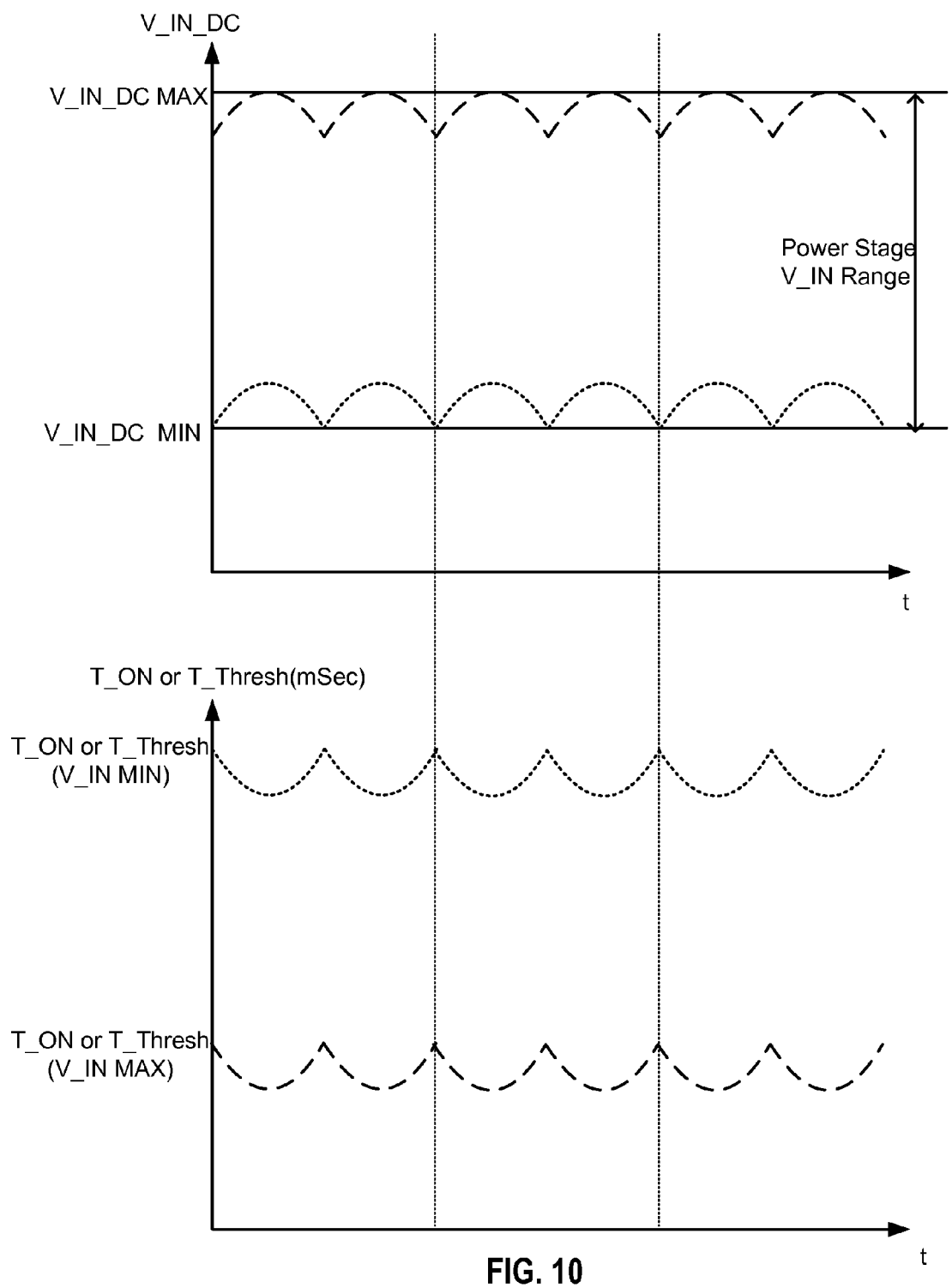
FIG. 10 illustrates the example T_ON and T_Thresh waveforms based on the unregulated DC input voltage waveforms shown in FIG. 2B.

FIG. 10 illustrates the example T_ON and T_Thresh waveforms based on the unregulated DC input voltage waveforms shown in FIG. 2B. Specially, as shown in FIG. 10, by measuring the on-time T_ON when the primary peak current is set to a constant threshold; or the Threshold Time T_Thresh that is counted from the moment the switch SW is turned on until the voltage at node N1 corresponding to the primary current, I_Pri, reaches a constant threshold I_Thresh, the measurement produces a reflected waveform of the unregulated input voltage V_IN_DC. From the reflected waveform, the DC input voltage waveform magnitude and shape can be determined.

Figure 11:
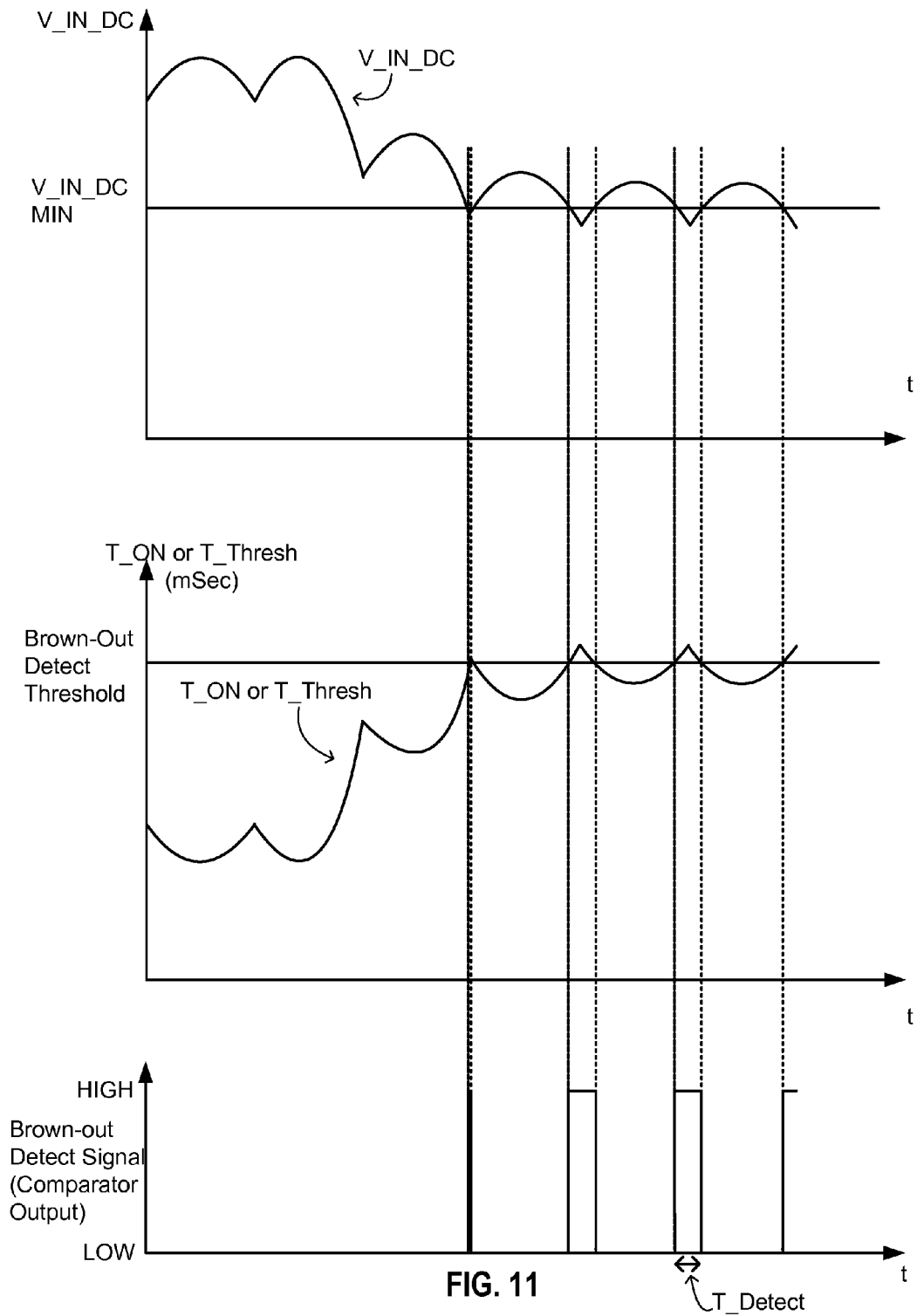
FIGS. 11 and 12 illustrate embodiments where the on-time or threshold time of each "ON" and "OFF" cycle is used to model the unregulated DC input voltage of a power stage to detect operating condition such as a brown out or loss of an AC power source.

FIG. 11 illustrates an embodiment where the on-time, T_ON, or threshold time, T_Thresh, of each "ON" and "OFF" cycle is used to model the unregulated DC input voltage of a power stage to detect an operating condition such as a brown out. For convenience, the waveform illustrated in FIG. 4B corresponding to a brown out condition is reproduced in FIG. 11. The corresponding on-time T_ON or threshold time T_Thresh measured for each "ON" and "OFF" cycle is also plotted below in FIG. 11.

As the DC input voltage V_IN_DC drops corresponding to a drop in the AC input voltage, the T_ON or T_Thresh of each cycle increases inversely as a function of V_IN_DC. In turn, the measured T_ON or T_Thresh of each cycle is compared to a brown out detection threshold. If the AC and corresponding DC input voltage V_IN_DC drops to a certain level, such as V_IN_DC MIN of the power stage, the corresponding T_ON or T_Thresh will increase to the brown-out detection threshold. As the input voltage declines, the periods during zero crossing of the corresponding AC input voltage waveform (e.g., those shown in FIG. 4A) will be the first to cause T_ON or T_Thresh to rise above the brown-out detection threshold.

A comparator (not shown) samples the T_ON or T_Thresh of each "ON" and "OFF" cycle against the "brown-out detection threshold" as shown in FIG. 11. The high outputs of the comparator are used to detect the presence of line-frequency ripple (e.g., 60/100/120 Hz) created by the AC input voltage waveform, as the output state of the comparator switches at the same frequency of the full rectified AC input source. Detecting the presence of line-frequency ripple enables the ability to distinguish a brown-out condition from other conditions, such as the power supply becoming uncoupled from the AC input voltage source. It also allows for the determination of the severity of the brown out, as the duty cycle (e.g., based on the duration of a high state T_Detect) of the comparator output will increase as the AC input voltage decreases, as well as determining the time duration of the brown-out. In other words, the time duration of the comparator output duty cycle increasing beyond a predetermined threshold indicates a potential detrimental decrease in the AC input voltage. The determination can be based on single or multiple line-cycle events. These factors are then used by the controller 601 to determine an appropriate action for power supply. This includes, but not limited to, thermal shut down, thermal de-rating, and transmitting a warning signal.

Figure 5A:
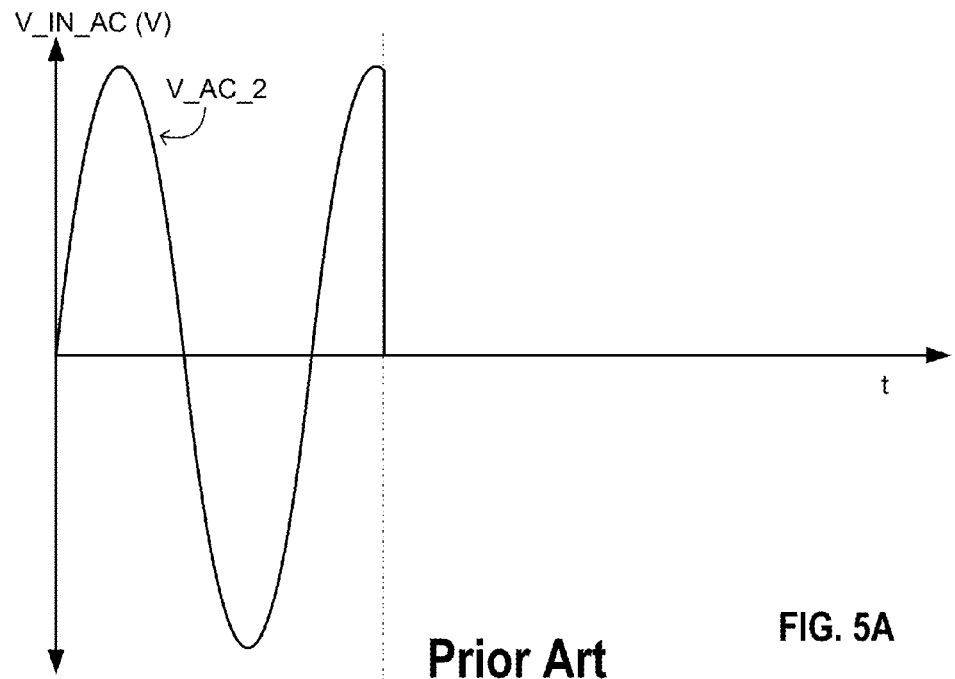
FIG. 5A illustrates an example waveform for AC input voltage and FIG. 5B illustrates the corresponding unregulated DC input voltage of a power stage, during a loss of an AC source condition.
Figure 5B:
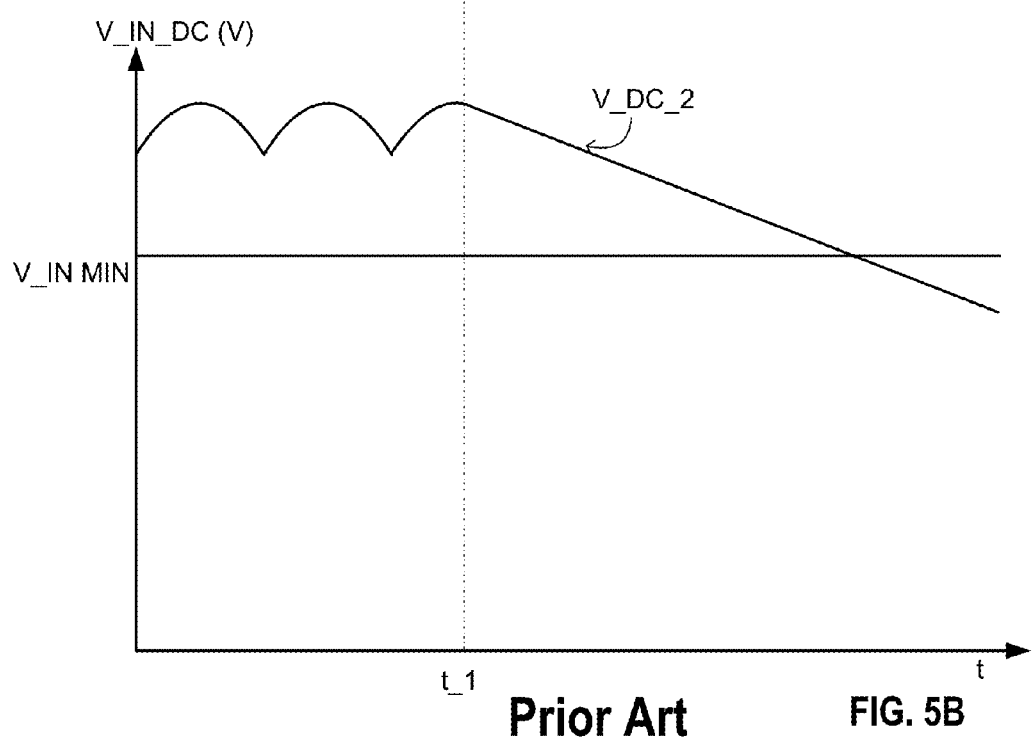
Figure 12:
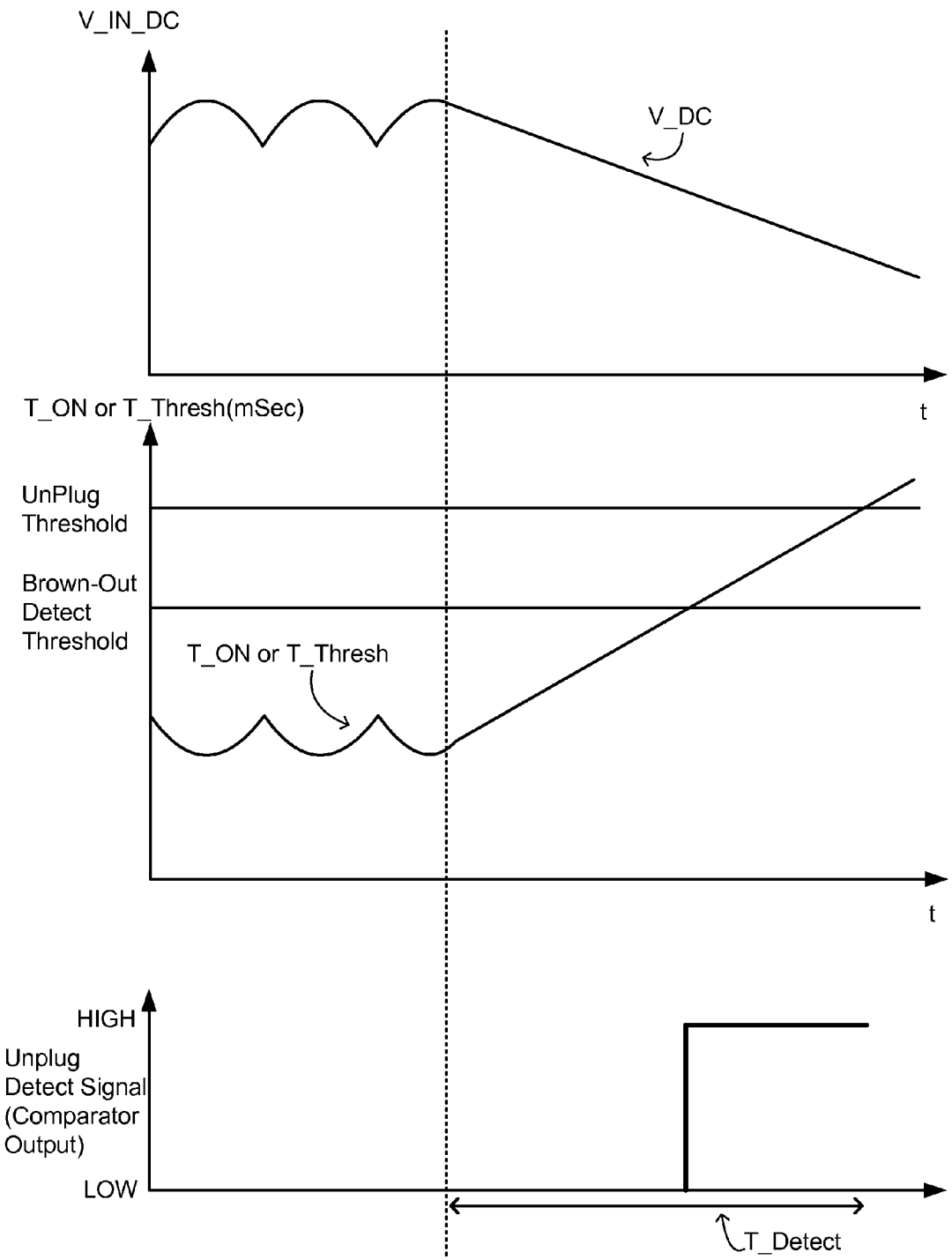

FIG. 12 illustrates an embodiment where the on-time, T_ON, or threshold time, T_Thresh, of each "ON" and "OFF" cycle is used to model the unregulated DC input voltage of a power stage to detect an operating condition such as a loss of an AC power source. For convenience, the waveform shown in FIG. 5B corresponding to loss of an AC power source is reproduced in FIG. 12. The T_ON or T_Thresh of each "ON" and "OFF" cycle is measured and is plotted in FIG. 12.

As the DC input voltage V_IN_DC drops corresponding to the removal of AC input voltage, the measured T_ON or T_Thresh increases inversely as a function of V_IN_DC. As described above, high outputs of the comparator may be used to detect the presence of line-frequency ripple (e.g., 60/100/120 Hz) created by the AC input voltage waveform, as the output state of the comparator switches at the same frequency of the full rectified AC input source. In a loss of AC input voltage source, the decrease of the DC input voltage V_IN_DC and corresponding rise of the T_ON or T_Thresh shape is linear (e.g., does not correspond to a line-frequency 60/100/120 Hz ripple). Accordingly, the duty cycle of the comparator (e.g., based on the duration of a high state T_Detect) becomes a step function. Therefore it can be determined that the power supply has become uncoupled from the AC input voltage source from the shape of the T_ON or T_Thresh curve as well as the absolute value or based on a threshold duration of T_Detect.

As with brown-out detection, an "unplug threshold" may be compared with the T_ON or T_Thresh in order to detect a drop in DC input voltage V_DC_IN related to the power supply becoming uncoupled from the AC input voltage source. This determination normally manifests as a single event since T_ON or T_Thresh shape is linear. On the other hand, under no-load or light load conditions or if the AC input voltage was high prior to unplug (such as 270 VAC), it would take a relatively long time before the T_ON or T_Thresh would reach the unplug threshold. Accordingly, if the shape of the T_ON or T_Thresh curve is linear for an extended period of time either through direct measurement or inferred from the duration of T_Detect, it can be determined that the power supply has been decoupled from the AC input voltage source prior to the T_ON or T_Thresh reaching the unplug threshold. Once it has been determined that the power supply has become decoupled from the AC input voltage source, a number appropriate actions may be taken by the controller 601 of a power converter, such as discharging the energy stored in the bulk capacitor safely in an expedient manner.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:

1. A switching power converter, comprising:
   a transformer coupled between an input and an output of the switching power converter, the transformer including a primary winding coupled to the input to receive an input voltage and a secondary winding coupled to the output of the switching power converter;
   a switch coupled to the primary winding of the transformer, a current through the primary winding being generated while the switch is turned on and not being generated while the switch is turned off; and
   a controller at a primary winding side of the transformer and configured to:
      generate a control signal to turn on or turn off the switch, the switch being turned on responsive to the control signal being in a first state and the switch being turned off responsive to the control signal being in a second state,
      indirectly detect the input voltage to the switching power converter based on the current through the primary winding generated while the switch is turned on, and
      detect a brown out condition resulting from a temporary decrease in the input voltage responsive to the indirectly detected input voltage being below a minimum allowed value of the input voltage, the controller to detect the brown out condition by:
         determining a threshold time it takes for the current through the primary winding to reach a current threshold during a switching cycle of the switching power converter, and
         determining timings at which the threshold time at the switching cycle reaches a reference time, the reference time being set below a maximum possible value corresponding to the minimum allowed value of the input voltage.

2. The switching power converter of claim 1, wherein the controller is configured to generate a signal indicative of the current through the primary winding reaching the current threshold.

3. The switching power converter of claim 2, wherein the controller generates the signal indicative of the current through the primary winding reaching the current threshold, responsive to a voltage corresponding to the current through the primary winding reaching a reference voltage corresponding to the current threshold.

4. The switching power converter of claim 2, wherein the controller is configured to determine the input voltage as a product of the current threshold and a constant, divided by the threshold time.

5. The switching power converter of claim 4, wherein the constant is a magnetizing inductance of the primary winding of the transformer.

6. The switching power converter of claim 4, wherein the controller is configured to detect the brown out condition, responsive to the threshold time reaching the reference time a plurality of instances over a plurality of switching cycles of the switching power converter.

7. A switching power converter, comprising:
   a transformer coupled between an input and an output of the switching power converter, the transformer including a primary winding coupled to the input to receive an input voltage and a secondary winding coupled to the output of the switching power converter;
   a switch coupled to the primary winding of the transformer, a current through the primary winding being generated while the switch is turned on and not being generated while the switch is turned off; and
   a controller at a primary winding side of the transformer and configured to:
      generate a control signal to turn on or turn off the switch, the switch being turned on responsive to the control signal being in a first state and the switch being turned off responsive to the control signal being in a second state,
      generate a signal indicative of the current through the primary winding reaching a current threshold,
      determine a threshold time it takes for the current through the primary winding to reach the current threshold during a switching cycle of the switching power converter,
      indirectly detect the input voltage to the switching power converter based on the current through the primary winding generated while the switch is turned on, the indirectly detected input voltage determined as a product of the current threshold and a constant, divided by the threshold time, and
      detect a loss of power condition resulting from a removal of the input voltage, responsive to the threshold time increasing substantially linearly over a plurality of switching cycles.

8. The switching power converter of claim 4, wherein the controller is configured to detect a loss of power condition resulting from a removal of the input voltage, responsive to the threshold time persistently exceeding the threshold time over a plurality of switching cycles.

9. A method of operating a switching power converter, the switching power converter including a transformer coupled between an input and an output of the switching power converter, the transformer including a primary winding coupled to the input to receive an input voltage and a secondary winding coupled to the output of the switching power converter, a switch coupled to the primary winding of the transformer, a current through the primary winding being generated while the switch is turned on and not being generated while the switch is turned off, and a controller at a primary winding side of the transformer and configured to generate a control signal to turn on or turn off the switch, the switch being turned on responsive to the control signal being in a first state and the switch being turned off responsive to the control signal being in a second state, the method comprising:

determining the current through the primary winding generated while the switch is turned on;

indirectly detecting the input voltage to the switching power converter while the switch is turned on based on the determined current through the primary winding; and detecting a brown out condition resulting from a temporary decrease in the input voltage responsive to the indirectly detected input voltage being below a minimum allowed value of the input voltage, detecting the brown out condition comprising:

determining a threshold time it takes for the current through the primary winding to reach a current threshold during a switching cycle of the switching power converter, and determining timings at which the threshold time at the switching cycle reaches a reference time, the reference time being set below a maximum possible value corresponding to the minimum allowed value of the input voltage.

10. The method of claim 9, further comprising generating a signal indicative of the current through the primary winding reaching the current threshold.

11. The method of claim 10, wherein the signal indicative of the current through the primary winding reaching the current threshold is generated responsive to a voltage corresponding to the current through the primary winding reaching a reference voltage corresponding to the current threshold.

12. The method of claim 10, wherein the input voltage is determined as a product of the current threshold and a constant, divided by the threshold time.

13. The method of claim 12, wherein the constant is a magnetizing inductance of the primary winding of the transformer.

14. The method of claim 12, further comprising detecting the brown out condition, responsive to the threshold time reaching the reference time a plurality of instances over a plurality of switching cycles of the switching power converter.

15. The method of claim 12, further comprising detecting a loss of power condition resulting from a removal of the input voltage, responsive to the threshold time increasing substantially linearly over a plurality of switching cycles.

16. The method of claim 12, further comprising detecting a loss of power condition resulting from a removal of the input voltage, responsive to the threshold time persistently exceeding the threshold time over a plurality of switching cycles.

\* \* \* \* \*